US012082256B2

(12) United States Patent
Takeda et al.

(10) Patent No.: US 12,082,256 B2
(45) Date of Patent: Sep. 3, 2024

(54) TERMINAL, BASE STATION, RADIO COMMUNICATION METHOD, AND SYSTEM FOR DETERMINING A PHYSICAL DOWNLINK CONTROL CHANNEL MONITORING OCCASION

(71) Applicant: NTT DOCOMO, INC., Tokyo (JP)

(72) Inventors: Kazuki Takeda, Tokyo (JP); Tomoya Ohara, Tokyo (JP); Hideaki Takahashi, Tokyo (JP); Yuki Matsumura, Tokyo (JP); Satoshi Nagata, Tokyo (JP); Lihui Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 671 days.

(21) Appl. No.: 17/267,374

(22) PCT Filed: Aug. 10, 2018

(86) PCT No.: PCT/JP2018/030148
§ 371 (c)(1),
(2) Date: Feb. 9, 2021

(87) PCT Pub. No.: WO2020/031386
PCT Pub. Date: Feb. 13, 2020

(65) Prior Publication Data
US 2021/0274562 A1   Sep. 2, 2021

(51) Int. Cl.
*H04W 74/0833* (2024.01)
*H04L 5/00* (2006.01)
*H04W 56/00* (2009.01)
*H04W 72/23* (2023.01)

(52) U.S. Cl.
CPC ....... *H04W 74/0833* (2013.01); *H04L 5/0048* (2013.01); *H04W 56/001* (2013.01); *H04W 72/23* (2023.01)

(58) Field of Classification Search
None
See application file for complete search history.

(56) References Cited

U.S. PATENT DOCUMENTS

| | | | | |
|---|---|---|---|---|
| 2019/0306700 A1* | 10/2019 | Lin | ................. | H04W 72/23 |
| 2019/0306832 A1* | 10/2019 | Si | ................. | H04W 16/14 |
| 2019/0327767 A1* | 10/2019 | Islam | ............... | H04L 27/2666 |

(Continued)

OTHER PUBLICATIONS

"MCC Support, Final Report of 3GPP TSG RAN WG1 #93 v1.0.0 (Busan, South Korea, May 21-25, 2018), 3GPP TSG RAN WG1 Meeting #94 Gothenburg, Sweden, Aug. 20-24, 2018, R1-1808001, pp. 62 and 97" (Year: 2018).*

(Continued)

*Primary Examiner* — Liem H. Nguyen
(74) *Attorney, Agent, or Firm* — Osha Bergman Watanabe & Burton LLP

(57) ABSTRACT

A user terminal includes a receiving section that receives a signal in initial access or random access, and a control section that determines, based on reception of the signal, a specific signal quasi-co-located with a downlink control channel in a specific control resource set associated with a random access search space. According to an aspect of the present disclosure, monitoring of the downlink control channel can be appropriately controlled.

4 Claims, 9 Drawing Sheets

(56) References Cited

U.S. PATENT DOCUMENTS

| | | | |
|---|---|---|---|
| 2020/0045709 A1* | 2/2020 | Seo | H04W 72/53 |
| 2020/0120584 A1* | 4/2020 | Yi | H04L 5/005 |
| 2020/0229217 A1* | 7/2020 | Ly | H04W 72/1263 |
| 2021/0385826 A1* | 12/2021 | Moon | H04L 1/00 |
| 2023/0007646 A1* | 1/2023 | Chen | H04W 76/19 |

OTHER PUBLICATIONS

Ericsson, Remaining issues of PDCCH, 3GPP TSG RAN WG1 Meeting #93, R1-1807246, 4 Pages. (Year: 2018).*
3GPP TSG-RAN WG1 Meeting #93; Tdoc R1-1807246 "Remaining Issues of PDCCH" Ericsson; Busan, Korea; May 21-25, 2018 (4 pages).
3GPP TSG-RAN WG1 Meeting #93; Tdoc R1-1806217 "Remaining issues on beam measurement and reporting" Ericsson; Busan, Korea; May 21-25, 2018 (13 pages).
3GPP TSG RAN WG1 Meeting 91; R1-1720278 "Remaining details on PRACH procedure" Samsung; Reno, USA; Nov. 27-Dec. 1, 2017 (18 pages).
3GPP TSG-RAN WG1 Meeting NR#3; R1-1716384 "PRACH Procedure Considerations" Qualcomm Incorporated; Nagoya, Japan; Sep. 18-21, 2017 (16 pages).
Extended European Search Report issued in European Application No. 18929783.1, dated Feb. 28, 2022 (11 pages).
Office Action issued in Chilean Application No. 202100344 mailed on Apr. 18, 2022 (25 pages).
Office Action issued in Chilean Application No. 202100344 mailed on Dec. 30, 2022 (28 pages).
Office Action issued in Korean Application No. 10-2021-7005686 mailed on Jan. 25, 2023 (6 pages).
Office Action issued in counterpart Indian Application No. 202137005601 mailed on Oct. 28, 2022 (7 pages).
Office Action issued in Korean Application No. 10-2021-7005686 mailed on Jun. 28, 2022 (8 pages).
Office Action issued in Russian Application No. 2021104282/07(009289) mailed on Dec. 20, 2021 (6 pages).
International Search Report issued in PCT/JP2018/030148 on Oct. 16, 2018 (1 page).
Written Opinion of the International Searching Authority issued in PCT/JP2018/030148 on Oct. 16, 2018 (3 pages).
NTT Docomo, Inc.; "Remaining issues on RACH procedure"; 3GPP TSG RAN WG1 Meeting #92bis, R1-1805036; Sanya, China; Apr. 16-20, 2018 (6 pages).
CMCC; "Common CORESET design for RMSI scheduling"; 3GPP TSG RAN WG1 Meeting #90, R1-1713832; Prague, P.R. Czech; Aug. 21-25, 2017 (6 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
Office Action in the counterpart Korean Application No. 10-2021-7005686, mailed Jun. 16, 2023 (8 pages).
MediaTek Inc.: "On remaining issues of RACH procedure", 3GPP TSG RAN WG1 Meeting #93, R1-1807417; Busan, Korea, May 21-25, 2018 (7 pages).
Office Action issued in Korean Application No. 10-2021-7005686; Dated Feb. 6, 2024 (6 pages).
Office Action issued in Chinese Application No. 201880096490.6; Dated Mar. 6, 2024 (11 pages).

* cited by examiner

TERMINAL, BASE STATION, RADIO COMMUNICATION METHOD, AND SYSTEM FOR DETERMINING A PHYSICAL DOWNLINK CONTROL CHANNEL MONITORING OCCASION

TECHNICAL FIELD

The present disclosure relates to a user terminal and a radio communication method in next-generation mobile communication systems.

BACKGROUND ART

In the Universal Mobile Telecommunications System (UMTS) network, the specifications of Long Term Evolution (LTE) have been drafted for the purpose of further increasing high speed data rates, providing lower latency and so on (see Non-Patent Literature 1). For the purpose of further high capacity, advancement of LTE (LTE Rel. 8, Rel. 9), and so on, the specifications of LTE-A (LTE-Advanced, LTE Rel. 10 to Rel. 14) have been drafted.

Successor systems of LTE (referred to as, for example, "Future Radio Access (FRA)," "5th generation mobile communication system (5G)," "5G+ (plus)," "New Radio (NR)," "New radio access (NX)," "Future generation radio access (FX)," "LTE Rel. 14," "LTE Rel. 15" (or later versions), and so on) are also under study.

In initial access in NR, at least one of detection of a synchronization signal block (SSB), acquisition of broadcast information (for example, master information block (MIB)) transmitted by a broadcast channel (also referred to as a "broadcast channel (Physical Broadcast Channel (PBCH))," "P-BCH," and so on), and establishment of a connection by random access is performed.

Here, the SSB is a signal block including at least one of synchronization signals (for example, a primary synchronization signal (PSS), a secondary synchronization signal (SSS, primary synchronization signal) and a PBCH and is also referred to as a "SS/PBCH block," and so on.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

For NR, studies have been conducted about determination of a quasi-co-location (QCL) related to a control resource set (CORESET) (for example, CORESET #0) configured based on an MIB or a system information block (SIB) 1, the determination being made by a user terminal based on an SSB (or an index of the SSB).

On the other hand, it is assumed that a signal QCLed with the control resource set (or a downlink control channel) is varied by movement of the user terminal or the like. In a case where the signal QCLed with the control resource set is not appropriately determined, performance of the system may be degraded.

In view of such circumstances, an object of the present disclosure is to provide a user terminal and a radio communication method that appropriately control monitoring of a downlink control channel.

Solution to Problem

A user terminal according to an aspect of the present disclosure includes a receiving section that receives a signal in initial access or random access, and a control section that determines, based on reception of the signal, a specific signal quasi-co-located with a downlink control channel in a specific control resource set associated with a random access search space.

Advantageous Effects of Invention

According to an aspect of the present disclosure, monitoring of the downlink control channel can be appropriately controlled.

DESCRIPTION OF EMBODIMENTS

Figure 1:
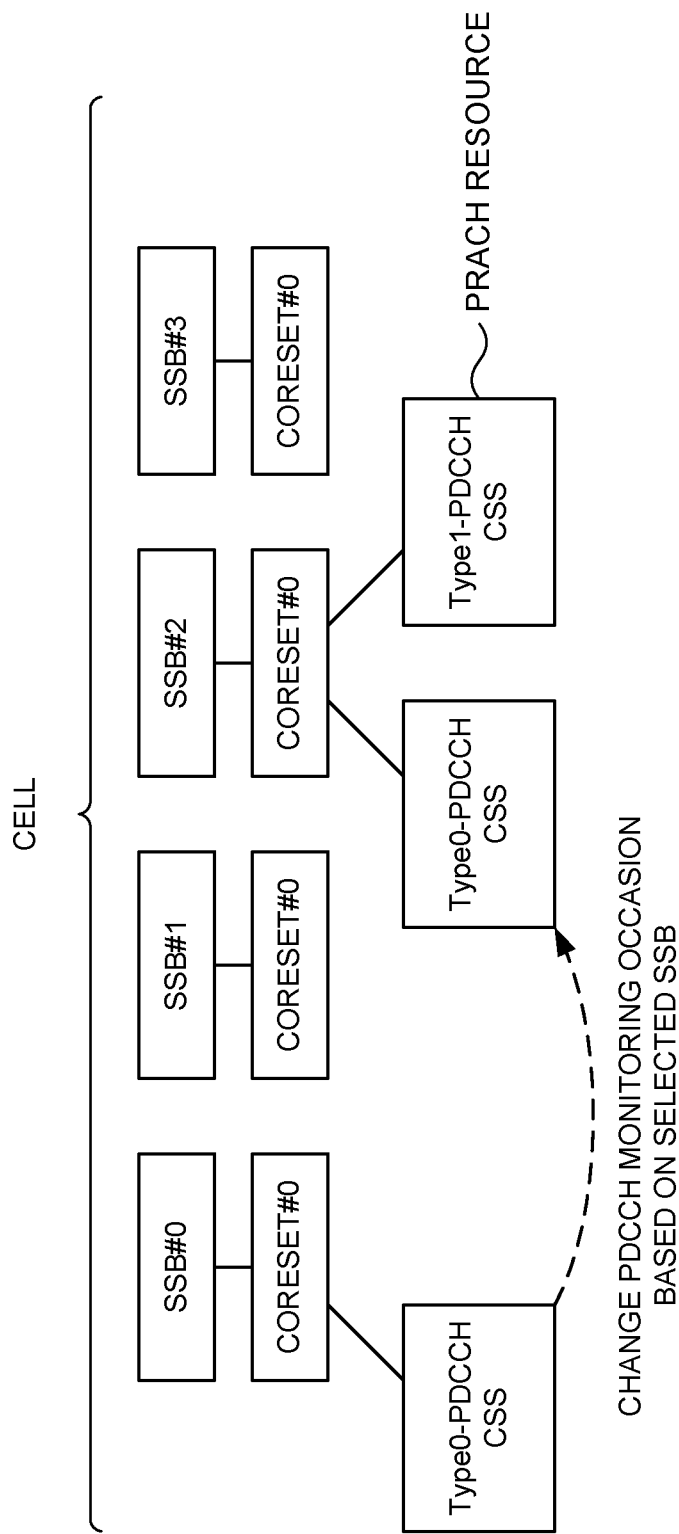
FIG. 1 is a diagram to show an example of an operation of changing a QCL source in an SSB-based RA in case 1.

For future radio communication systems (for example, NR, 5G, 5G+, Rel.15 or later version), studies have been conducted about the use of a control resource set (CORESET) for transmission of a physical layer control signal (for example, downlink control information (DCI)) from the base station (which may be also referred to, for example, as a "Base Station (BS)," a "transmission/reception point (TRP)," an "eNodeB (eNB)," a "NR NodeB (gNB)," and so on) to a user terminal.

The CORESET is allocation candidate regions for a downlink control channel (for example, Physical Downlink Control Channel (PDCCH)). The CORESET may include a given frequency domain resource and a given time domain resource (for example, one or two OFDM symbols). The PDCCH (or DCI) is mapped to given resource units in the CORESET.

The given resource unit may be at least one of, for example, a control channel element (CCE), a CCE group including one or more CCEs, a resource element group (REG) including one or more resource elements (REs), one or more REG bundles (REG group), and a physical resource block (PRB).

The user terminal monitors (blind-decodes) a search space (SS) in the CORESET to detect DCI for the user terminal. The search space may include a search space (common search space (CSS)) used for the monitoring of (cell-specific) DCI which is common to one or more user terminals and a search space (user-specific search space (USS)) used for the monitoring of DCI specific to the user terminal.

The CSS may include at least one of the following.
Type 0-PDCCH CSS
Type 0A-PDCCH CSS
Type 1-PDCCH CSS
Type 2-PDCCH CSS
Type 3-PDCCH CSS The type 0-PDCCH CSS is also referred to as SIB1 SS, Remaining Minimum System Information (RMSI) SS, and so on. The type 0-PDCCH CSS may be a search space for DCI that is CRC-scrambled with a given identifier (for example, a System Information-Radio Network Temporary Identifier (SI-RNTI)) (search space for the monitoring of DCI used for scheduling of downlink shared channel (Physical Downlink Shared Channel (PDSCH)) transmitting the SIB1).

Here, the CRC scrambling refers to addition (inclusion), to the DCI, of CRC bits to be scrambled (masked) with a given identifier.

The type 0A-PDCCH CSS is also referred to as an OSI (Other System Information) SS and so on. The type 0A-PDCCH CSS may be a search space for DCI that is CRC-scrambled with a given identifier (for example, the SI-RNTI) (search space for the monitoring of DCI used for scheduling of a PDSCH transmitting the OSI).

The type 1-PDCCH CSS is also referred to as a "random access (RA) SS," and the like. The type 1-PDCCH CSS may be a search space for DCI that is CRC-scrambled with a given identifier (for example, a Random Access-RNTI (RA-RNTI), a Temporary Cell-RNTI (TC-RNTI) or a Cell-RNTI (C-RNTI)) (search space for the monitoring of DCI used for scheduling of a PDSCH transmitting a message for an RA procedure (for example, Random Access Response (RAR, message 2), message for the contention resolution (message 4))).

The type 2-PDCCH CSS is also referred to as a paging SS and so on. The type 2-PDCCH CSS may be a search space for DCI that is CRC-scrambled with a given identifier (for example, a Paging-RNTI (P-RNTI)) (search space for the monitoring of DCI used for scheduling of a PDSCH transmitting paging).

The type 3-PDCCH CSS may be a search space for DCI that is CRC-scrambled with a given identifier (for example, an Interruption RNTI (INT-RNTI) for DL preemption indication, a Slot Format Indicator RNTI (SFI-RNTI) for the slot format indication, a TPC-PUSCH-RNTI for transmit power control (TPC) of the Physical Uplink Shared Channel (PUSCH), a TPC-PUCCH-RNTI for the TPC of the Physical Uplink Control Channel (PUCCH), a TPC-SRS-RNTI for the TPC of the Sounding Reference Signal (SRS), a C-RNTI, a Configured Scheduling RNTI (CS-RNTI) or a Semi-Persistent-CSI-RNTI (SP-CSI-RNTI)).

The USS may be a search space for DSI to which CRC bits CRC-scrambled with a given identifier (for example, a C-RNTI, a CS-RNTI, or an SP-CSI-RNTI) are added (included).

In initial access in NR, at least one of detection of a synchronization signal block (SSB, SS/PBCH block), acquisition of broadcast information (for example, a master information block (MIB)) transmitted by a broadcast channel (also referred to as a "broadcast channel (Physical Broadcast Channel (PBCH))," "P-BCH," and so on), and establishment of a connection by random access is performed.

For example, the user terminal (User Equipment (UE)) determines a CORESET for the type 0-PDCCH CSS and a PDCCH monitoring occasion, based on a detected SSB. The UE may identify the type 0 PDCCH CSS by using CORESET #0 and search space #0

CORESET #0 may be a control resource set used for scheduling of system information or may be a CORESET determined by at least one of reception of an SSB in initial access and information in the system information, the information indicating a CORESET used for scheduling of the system information. A common CORESET may be a control resource set not used for scheduling of the system information. Search space #0 may be a search space determined by at least one of reception of the SSB in the initial access and information in the system information, the information indicating a search space used for scheduling of the system information.

Subsequently, the UE monitors the type 0-PDCCH CSS in the PDCCH monitoring occasion, and receives system information (for example, System Information Block 1 (SIB1), Remaining Minimum System Information (RMSI) on the PDSCH scheduled by the received PDCCH.

The system information may include common PDCCH configuration information (PDCCH-ConfigCommon). The common PDCCH configuration information may include CORESET #0 information (controlResourceSetZero) and common CORESET information (commonControlResourceSet) as CORESET information. The common PDCCH configuration information may further include, as search space information, search space #0 information (searchSpaceZero), a search space for SIB1 (Type 0-PDCCH CSS) information (searchSpaceSIB1), a search space for OSI (Type 0A-PDCCH CSS) information (searchSpaceOtherSystemInformation), paging search space (Type 2-PDCCH CSS) information (pagingSearchSpace), and a random access search space (Type 1-PDCCH CSS) information (ra SearchSpace).

CORESET for SIB1 is CORESET used for scheduling of a downlink shared channel (for example, PDSCH (Physical Downlink Shared Channel)) transmitting the SIB1 but in which PDCCH (or DCI) is allocated. CORESET for SIB1 is also referred to as CORESET #0, controlResourceSetZero, common CORESET, common CORESET #0, cell-specific CORESET and so on.

CORESET #0 may be associated with one or more search spaces. The search space may include at least one of a search space (common search space (CSS)) used for the monitoring of (cell-specific) DCI which is common to one or more user terminals and a search space (UE specific search space (USS)) used for the monitoring of DCI specific to the user terminal.

The random access search space may be associated with one of CORESET #0 and common CORESET. Search space #0, the search space for SIB1, the search space for OSI, and the paging search space may be associated with CORESET

0. CORESET #0, search space #0, and the search space for SIB1 may be used for at least one of handover and PSCell addition.

The user terminal may determine CORESET #0 for the type 0-PDCCH CSS and the PDCCH monitoring occasion for the type 0-PDCCH CSS based on the received SSB and the MIB obtained from the PBCH in the SSB.

For example, the UE may determine CORESET #0 for the type 0-PDCCH CSS (frequency resource and time resource), based on the 4 upper bits of 8 bits of the PDCCH configuration information for SIB1 in the MIB (pdcch-ConfigSIB1), and determine the PDCCH monitoring occasion for the type 0-PDCCH CSS, based on the 4 lower bits and the index of the received SSB.

For example, the UE may determine, for CORESET #0, at least one of the number of RBs ($N^{CORESET}_{RB}$), the number of symbols ($N^{CORESET}_{symb}$), and an RB offset that are associated with an index indicated by controlResourceSetZero, based on at least one of the 4 upper bits of the PDCCH configuration information for SIB1, a minimum channel bandwidth, a subcarrier spacing of the SSB, and a subcarrier spacing of the PDCCH.

The UE may determine at least one of the number of search spaces per slot, a frame number, a slot number, and a start symbol index for the PDCCH monitoring occasion based on at least one of the index of the received SSB, the PDCCH configuration information for SIB1 in the SSB (pdcch-ConfigSIB1), the subcarrier spacing of the SSB, and the subcarrier spacing of the PDCCH.

The band of CORESET #0 may be interchanged with the band of a bandwidth part (BWP, partial band) for initial access (also referred to as initial BWP or the like). Here, the BWP is a partial band within a carrier (component carrier (CC)), a cell, a serving cell, or a system bandwidth), the BWP may include a BWP for uplink (uplink BWP) and a BWP for downlink (downlink BWP).

For example, for the user terminal, one or more BWPs (at least one of one or more uplink BWPs and one or more downlink BWPs) may be configured, and a least one of the configured BWPs may be activated. The activated BWP is also referred to as an active BWP or the like.

Alternatively, the user terminal may determine CORESET #0, based on CORESET #0 information (controlResourceSetZero) in common PDCCH configuration information (PDCCH-ConfigCommon) in the system information (SIB1). The controlResourceSetZero (for example, 4 bits) may be interpreted as corresponding bits (for example, the 4 most significant bits) in pdcch-ConfigSIB1 in the MIB.

Note that controlResourceSetZero in SIB1 may be configured for each serving cell and/or for each downlink BWP. The user terminal may obtain parameters for CORESET #0 regardless of the current active BWP even in a case where controlResourceSetZero is included in the configuration information related to the PDCCH (PDCCH-ConfigCommon, pdcchConfigCommon) in the initial BWP (BWP #0).

The UE may receive UE-specific BWP configuration information (BWP information element) indicating a UE-specific BWP through specific signaling (higher layer signaling) after RRC connection. The UE-specific BWP configuration information may include common PDCCH configuration information (PDCCH-ConfigCommon) and UE-specific PDCCH configuration information (PDCCH-Config). The common PDCCH configuration information may provide a configuration for a common search space (search spaces other than the type 3-PDCCH CSS) The PDCCH configuration information may provide configurations for the type 3-PDCCH CSS and USS.

As described above, the user terminal may assume that there is a quasi-co-location (QCL) relationship between the detected SSB and an antenna port for a demodulation reference signal (DMRS) for the PDCCH in CORESET #0 (or a search space associated with CORESET #0) configured based on the SSB (MIB) or SIB1.

The QCL is an indicator indicating a statistical property of at least one of a channel and a signal (channel/signal). For example, in a case where one signal and another signal are in a QCL relationship, the relationship may mean that the plurality of different signals can be assumed to be identical in a Doppler shift, a Doppler spread, an average delay, a delay spread, and a spatial parameter, (for example, a spatial Rx parameter) (the signals are quasi-co-located with one another in terms of at least one of these parameters).

The information related to the QCL may also be referred to as the state of a transmission configuration indication or transmission configuration indicator (TCI) (TCI-state). The TCI-state may be identified using a given identifier (TCI State ID (TCI-StateId)).

A plurality of types (QCL types) may be defined for the QCL.

For example, four QCL types A to D may be provided for which parameters (or a parameter set) that can be assumed to be identical are different. Such parameters are shown below:

QCL type A: the Doppler shift, Doppler spread, average delay, and delay spread
QCL type B: the Doppler shift and Doppler spread.
QCL type C: the Doppler shift and average delay, and delay spread
QCL type D: the spatial Rx parameter Not that "plurality of channels/signals are identical to or different from one another in the TCI-state" is synonymous with "plurality of channels/signals are transmitted or received by using different or identical beams (or transmission and reception point (TRP)". The user terminal can assume that different TCI-states indicate that the channels/signals are transmitted from different beams (TRP). "TRP" may be interchanged with a network, a base station, an antenna apparatus, an antenna panel, a serving cell, a cell, a component carrier (CC), a carrier, and so on.

A signal (for example, a reference signal (RS), the SSB, or the CSI-RS) QCLed with the PDCCH (DMRS of the PDCCH) may be referred to as a QCL source (QCL reference or QCL reference signal) of the PDCCH. The TCI-state may indicate the QCL source. The UE may associate (may set) the QCL source with (for) at least one of the PDCCH, search space, and CORESET.

For a random access procedure, the UE may be configured with a plurality of PRACH resources associated with the respective plurality of RSs(SSBs or CSI-RSs), and select a preferred RS (RS satisfying required quality), based on measurement result (for example, received power (reference signal received power (RSRP)) and received quality (reference signal received quality (RSRQ)) to select a corresponding PRACH resource.

For example, in a case where the base station uses 16 beams, the UE is configured with 16 PRACH resources associated with the 16 RSs. The UE selects one of the PRACH resources that corresponds to the RS having the best measurement result (or satisfying required quality), and transmit a PRACH (random access preamble, Msg. 1) by using the selected PRACH resource. The base station selects an appropriate beam (base station transmit beam), based on the received PRACH and uses the selected beam to transmit the PDCCH for scheduling of an RAR (random access response, Msg. 2) and the PDSCH including the RAR. The UE assumes reception of the PDCCH and the PDSCH transmitted using the beam associated with the PRACH resource used for transmission of the PRACH (the PDCCH and the PDSCH are QCLed with the RS associated with the PRACH resource).

For the UE, the PRACH resource (including at least one of a random access preamble sequence, the index of the associated RS, and the occasion) may be configured based on the system information or through the higher layer signaling.

Studies have been conducted about the recognition, by the UE, of the QCL source for the PDCCH (RS QCLed with the PDCCH) based on the TCI state of the CORESET, for the PDCCHs other than the PDCCH for scheduling of the RAR.

In the random access procedure, the UE transmits the PRACH (Msg. 1) and then monitors the PDCCH based on random access search space information (ra-SearchSpace) to receive the RAR (random access response, Msg. 2). For example, the UE identifies a CORESET ID associated with the random access search space and monitors the PDCCH in the identified CORESET and random access search space.

Here, studies have been conducted about ignore, by the UE, of TCI state (QCL source) of the CORESET associated with the random access search space for RAR reception. Instead, the UE may determine the QCL source for the PDCCH to be monitored within the random access search space based on the PRACH resource used for transmission of the Physical Random Access Channel (PRACH).

Studies have also been conducted about change of the QCL source for CORESET #0 using the random access procedure. For configuration of at least one of a PRACH preamble and the PRACH resource for contention free random access (CFRA), the UE may be configured with one or more SSBs or CSI-RSs as a QCL source for CORESET #0 after the CFRA, based on a dedicated RACH configuration (RACH-ConfigDedicated). The UE may determine the SSB or CSI-RS selected during the CFRA as a new QCL source for CORESET #0. The UE may determine the SSB selected during contention based random access (CBRA), as a new QCL source for CORESET #0 after the CBRA.

It is conceivable that determination of the QCL source based on the PRACH resource as described above may affect the PDCCH monitoring. In a case where the PDCCH monitoring is not appropriately performed, performance of the system may be degraded.

Thus, the inventors of the present invention came up with the idea of a method for the UE appropriately monitoring the PDCCH in the random access procedure.

Embodiments according to the present disclosure will be described in detail with reference to the drawings as follows. The radio communication method according to each embodiment may be employed independently or may be employed in combination.

In the present disclosure, for example, the higher layer signaling may be any one or combinations of Radio Resource Control (RRC) signaling, Medium Access Control (MAC) signaling, broadcast information, and so on.

For example, the MAC signaling may use MAC control elements (MAC CE), MAC PDUs (Protocol Data Units), and the like. For example, the broadcast information may be master information blocks (MIBs), system information blocks (SIBs), minimum system information (Remaining Minimum System Information (RMSI)), other system information (OSI), and so on.

In the present disclosure, the QCL source for one CORESET may be interpreted as the QCL resource for arbitrary PDCCH associated with the CORESET. The QCL source for one search space may be interpreted as the QCL resource for arbitrary PDCCH associated with the search space.

The following embodiments may be applied to the CFRA or to the CBRA.

(Aspect 1)

In Aspect 1, both the random access search space (ra-SearchSpace, type 1-PDCCH CSS) and search space #0 are associated with CORESET #0 (case 1).

Search space #0 may be one of the type 0-PDCCH CSS, the search space identified by the received index of SSB and the MIB, and the search space configured by the search space #0 information in the common PDCCH configuration information or the SIB1 search space information.

CORESET #0 may be one of the CORESET identified by the received index of the SSB and the MIB, and the CORESET configured by the CORESET #0 information in the common PDCCH configuration information.

The common PDCCH configuration information may be common PDCCH configuration information for an initial active DL BWP which information is included in the system information (SIB1, broadcast information), or common PDCCH configuration information for the UE-specific DL BWP which information is included in UE-specific BWP configuration information (BWP information element) reported through dedicated signaling.

The random access search space may be associated with the same CORESET as that for search space #0.

The UE may assume that CORESET #0 is QCLed with the selected SSB in initial access or random access (may determine the selected SSB to be a QCL source for CORESET #0). The UE may measure and select the SSB for selection of the PRACH resource in the initial access or random resource.

In a case where the CFRA or CBRA of the UE is triggered and the UE selects, for PRACH transmission, an SSB different from the SSB used as a QCL source, the UE may use the SSB as a new QCL source for CORESET #0. In a case where the SSB is a QCL source for CORESET #0, the UE may monitor all the search spaces associated with CORESET #0.

The UE may change the PDCCH monitoring occasion for search space #0 depending on change of the SSB (QCL source).

The random access performed in a case where the PRACH resource is associated with the SSB may be referred to as SSB-based RA (SSB-based Random Access). In the SSB-based RA, the SSB is a QCL source for the CORESET associated with the random access response (also referred to as RAR or Msg. 2) and the PDCCH for scheduling of the RAR. In other words, in the SSB-based RA, the UE determines one of the SSBs within the cell that satisfies the required quality, transmits the PRACH by using the PRACH resource associated with the SSB, and on the assumption that the RAR for the PRACH and the PDCCH for scheduling of the RAR are in QCL with the SSB, receives the RAR and the PDCCH for scheduling of the RAR.

For example, in a case where the SSB-based RA of the UE is triggered, the UE may set the SSB selected in the RA as a QCL source for CORESET #0. For example, in a case where the SSB-based RA of the UE is triggered and the UE selects, for PRACH transmission, an SSB different from the SSB used as a QCL source, the UE may set the SSB as a QCL source for CORESET #0.

The UE may determine the PDCCH monitoring occasion for search space #0, based on the SSB. By using the PRACH resource associated with the SSB to perform PRACH transmission, the UE may report the SSB to the base station. In other words, the UE may determine (change) the PDCCH monitoring occasion for search space #0 as well as the QCL source according to selection of the SSB.

For example, the UE may determine at least one of the number of search spaces per slot, the frame number, the slot number, and the start symbol index for the PDCCH monitoring occasion based on at least one of the index of the selected SSB, the PDCCH configuration information for SIB1 in the SSB (pdcch-ConfigSIB1), the subcarrier spacing of the SSB, and the subcarrier spacing of the PDCCH.

For example, as illustrated in FIG. 1, with SSB #0 set as a QCL source for CORESET #0, in a case where the SSB-based RA of the UE is triggered and the UE selects SSB #2 for the PRACH resource based on measurement of SSB #0 to SSB #3, the QCL source for the CORESET #0 is changed to SSB #2, and the PDCCH monitoring occasion for the type 0-PDCCH CSS (CORESET #0 and search space #0) is changed based on SSB #2.

The UE uses, for PRACH transmission, the PRACH resource corresponding to SSB #2. The type 1-PDCCH CSS for RAR reception (random access search space) is associated with CORESET #0, and thus on the assumption that the type 1-PDCCH CSS is QCLed with SSB #2 used as a QCL source for CORESET #0, the UE monitors the type 1-PDCCH CSS within CORESET #0.

The PDCCH monitoring occasion is determined based on the QCL source, allowing the base station and the UE to recognize the pattern of the PDCCH monitoring occasion. The base station can recognize the timings and the number of blind decodings performed by the UE. The UE can determine PDCCH candidates to be dropped in a case of PDCCH monitoring overshoot.

The random access performed in a case where the PRACH resource is associated with the CSI-RS may be referred to as CSI-RS-based RA (CSI-RS-based Random Access). In the CSI-RS-based RA, the CSI-RS is a QCL source for the CORESET associated with the random access response (also referred to as RAR or Msg. 2) and the PDCCH for scheduling of the RAR. In other words, in the CSI-RS-based RA, the UE determines one of the CSI-RSs within the cell that satisfies the required quality, transmits the PRACH by using the PRACH resource associated with the CSI-RS, and on the assumption that the RAR for the PRACH and the PDCCH for scheduling of the RAR are in QCL with the CSI-RS, receives the RAR and the PDCCH for scheduling of the RAR.

In a case where the random access search space is associated with CORESET #0, for the CSI-RS-based RA, the UE may use the selected CSI-RS as a QCL source for CORESET #0 in a case where the CSI-RS-based RA of the UE is triggered.

On the other hand, the SSB may be a QCL source for CORESET #0. In other words, in a case where the random access search space is associated with CORESET #0, the UE need not support the CSI-RS-based RA.

Alternatively, in a case where the random access search space is associated with CORESET #0, the UE may assume that the CSI-RS-based RA is not configured. In this case, the QCL assumption for CORESET #0 can be fixed to the SSB, allowing a receiving operation of the terminal to be simplified.

According to Aspect 1, the random access search space is associated with CORESET #0, clarifying the QCL source for CORESET #0 and the PDCCH monitoring occasion for search space #0, and thus the UE can appropriately monitor the PDCCH.

(Aspect 2)

In Aspect 2, the random access search space (ra-SearchSpace, type 1-PDCCH CSS) is associated with the common CORESET (commonControlResourceSet) indicated in the commonPDCCH configuration information, and search space #0 are associated with CORESET #0 (case 2).

Search space #0 may be one of the type 0-PDCCH CSS, the search space identified by the received index of SSB and the MIB, and the search space configured by the search space #0 information in the common PDCCH configuration information or the SIB1 search space information.

CORESET #0 may be one of the CORESET identified by the received index of the SSB and the MIB, and the CORESET configured by the CORESET #0 information in the common PDCCH configuration information.

The common PDCCH configuration information may be common PDCCH configuration information for an initial active DL BWP which information is included in the system information (SIB1, broadcast information), or common PDCCH configuration information for the UE-specific DL BWP which information is included in UE-specific BWP configuration information (BWP information element) reported through dedicated signaling.

The QCL source for CORESET #0 and the QCL source for the common CORESET may differ from each other. Setting different SSBs for the QCL source for CORESET #0 and the QCL source for the common CORESET may be non-preferable. A preferable case where the QCL source for CORESET #0 and the QCL source for the common CORESET differ from each other may be a case in which the SSB is a QCL source for CORESET #0, and the CSI-RS associated with the SSB is set as a QCL source for the common CORESET.

For example, CORESET #0 may be associated with SSB #0, and the common CORESET may be associated with CSI RS #0 associated with SSB #0.

The UE may assume that CORESET #0 is QCLed with the SSB selected in the initial access or random access (may determine the selected SSB to be a QCL source for CORESET #0).

The UE may set, as a QCL source for the common CORESET, one of the SSB corresponding to the QCL source for CORESET #0 and the CSI-RS associated with the SSB corresponding to the QCL source for CORESET #0. The UE may measure and select the CSI-RS for selection of the PRACH resource in the initial access or random resource.

In a case where the SSB-based RA of the UE is triggered, the UE may set the SSB selected in the RA as a QCL source for the common CORESET. In this case, the UE preferably also set the SSB as a QCL source for CORESET #0. For example, in a case where the SSB-based RA of the UE is triggered, and in the RA, the UE selects, for PRACH transmission, an SSB different from the SSB used as a QCL source, the UE may set the SSB as a QCL source for the common CORESET and a QCL source for CORESET #0.

As is the case with Aspect 1, the UE may determine the PDCCH monitoring occasion for search space #0, based on the SSB. By using the PRACH resource associated with the SSB to perform PRACH transmission, the UE may report the SSB to the base station. In other words, the UE may select (change) the PDCCH monitoring occasion for search space #0 as well as the QCL source according to selection (change) of the SSB.

In a case where the CSI-RS-based RA of the UE is triggered, the UE may set the CSI-RS selected in the RA as a QCL source for the common CORESET. In this case, preferably, the selected CSI-RS is associated with the SSB, and the SSB is a QCL source for CORESET #0.

In a case where the CSI-RS-based RA of the UE is triggered, and in the RA, the UE selects the CSI-RS associated with an SSB different from the SSB associate with CSI-RS used as a QCL source, the UE may set the CSI-RS as a QCL source for the common CORESET and may set, as a QCL source for CORESET #0, the SSB associated with the CSI-RS (associated SSB).

In a case where the SSB associated with the selected CSI-RS differs from the SSB used as the QCL source for CORESET #0, the UE may change the QCL source for CORESET #0 to the SSB associated with the selected CSI-RS. In other words, the CSI-RS-based RA may require the CSI-RS to be associated with the SSB (require the CSI-RS to have an associated SSB).

The UE may determine the PDCCH monitoring occasion for search space #0, based on the SSB associated with the selected CSI-RS. By using the PRACH resource associated with the SSB to perform PRACH transmission, the UE may report the SSB to the base station. In other words, the UE may determine (change) the PDCCH monitoring occasion for search space #0 as well as the QCL source according to selection of the SSB.

Figure 2:
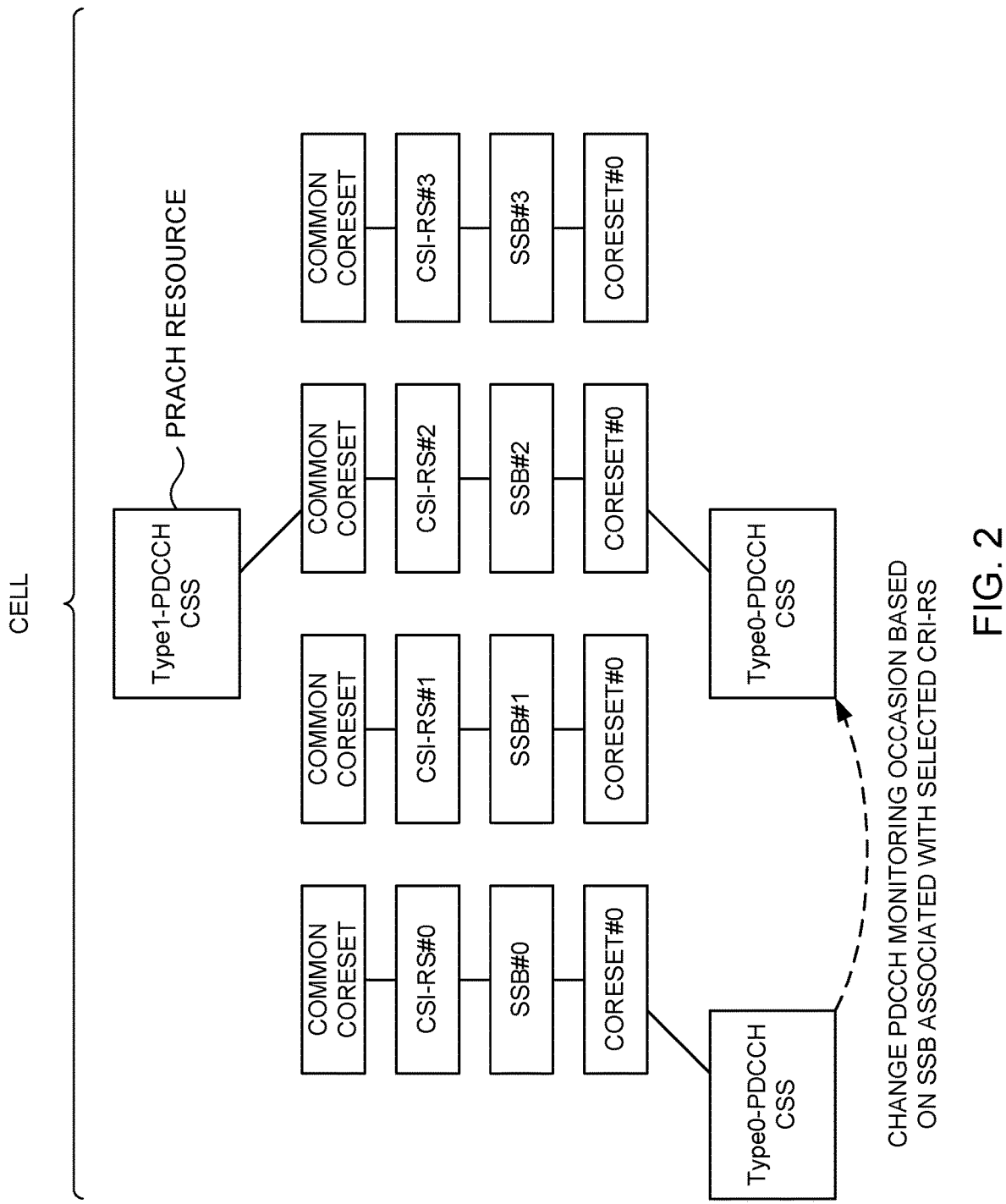
FIG. 2 is a diagram to show an example of an operation of changing a QCL source in a CSI-RS-based RA in case 2.

For example, as illustrated in FIG. 2, with the CSI-RS #0 set as a QCL source for the common CORESET and with SSB #0 associated with CSI-RS #0 set as a QCL source for CORESET #0, in a case where the CSI-RS-based RA of the UE is triggered and the UE selects CSI-RS #2 for the PRACH resource based on measurement of CSI-RS #0 to CSI-RS #3, the QCL source for the common CORESET is changed to CSI-RS #2, the QCL source for CORESET #0 is changed to SSB #2 associated with CSI-RS #2, and the PDCCH monitoring occasion for the type 0-PDCCH CSS (CORESET #0 and search space #0) is changed based on SSB #2 associated with CSI-RS #2.

The UE uses, for PRACH transmission, the PRACH resource corresponding to CSI-RS #2. The type 1-PDCCH CSS for RAR reception (random access search space) is associated with the common CORESET, and thus, on the assumption that the type 1-PDCCH CSS is QCLed with CSI-RS #2 used as a QCL source for the common CORESET, the UE monitors the type 1-PDCCH CSS within the common CORESET.

According to Aspect 2, the random access search space is associated with the common CORESET, clarifying the QCL source for CORESET #0 and the PDCCH monitoring occasion for search space #0, and thus the UE can appropriately monitor the PDCCH.

(Aspect 3) In Aspect 3, both the random access search space (ra-SearchSpace, type 1-PDCCH CSS) and search space #0 are associated with the common CORESET (commonControlResourceSet) (case 3).

Search space #0 may be one of the type 0-PDCCH CSS, the search space identified by the received index of SSB and the MIB, and the search space configured by the search space #0 information in the common PDCCH configuration information or the SIB1 search space information.

The common PDCCH configuration information may be common PDCCH configuration information for an initial active DL BWP which information is included in the system information (SIB1, broadcast information), or common PDCCH configuration information for the UE-specific DL BWP which information is included in UE-specific BWP configuration information (BWP information element) reported through dedicated signaling.

In a case where the DL BWP includes no initial active DL BWP or no SSB (is a non-overlapping DL BWP), the UE fails to monitor search space #0 or any other search space associated with CORESET #0. Among the CORESETs indicated in the common PDCCH configuration information, the UE can utilize only the common CORESET.

Therefore, preferably, at least in the non-overlapping DL BWP, all of the search space for SIB1, the search space for OSI, the paging search space, and the random access search space are associated with the common CORESET. The UE may be configured with case 3 for the non-overlapping DL BWP.

The UE may set the SSB or CSI-RS as a QCL source for the common CORESET. In a case where the UE uses the CSI-RS as a QCL source, the CSI-RS need not be associated with the SSB (need not have an associated SSB).

As is the case with Aspect 2, while the SSB or CSI-RS is being transmitted within the active DL BWP, the UE can perform the SSB-based RA or the CSI-RS-based RA.

In a case where the SSB-based RA or CSI-RS-based RA of the UE is triggered, the UE may set the SSB or CSI-RS selected in the RA as a QCL source for the common CORESET. For example, in a case where the SSB-based RA of the UE is triggered, and in the RA, the UE selects an SSB different from the SSB used as a QCL source, the UE may set the SSB as a QCL source for the common CORESET. For example, in a case where the CSI-RS-based RA of the UE is triggered, and in the RA, the UE selects a CSI-RS different from the CSI-RS used as a QCL source, the UE may set the CSI-RS as a QCL source for the common CORESET.

The CSI-RS for the CSI-RS-based RA need not be associated with the SSB. In this case, the UE does not use CORESET #0, and thus the PDCCH monitoring occasion for the type 0-PDCCH CSS fails to be made the same as that in the SSB for CORESET #0 and is configured through the UE-specific signaling.

In this case, the UE need not determine the PDCCH monitoring occasion for search space #0 depending on which SSB or CSI-RS has been selected for the random access by the UE, and the UE may change the QCL source for the common CORESET, based on the selected SSB or CSI-RS.

The UE may assume that the PDCCH monitoring occasion for the type 0-PDCCH CSS is not affected by the selected SSB or CSI-RS.

Figure 3:
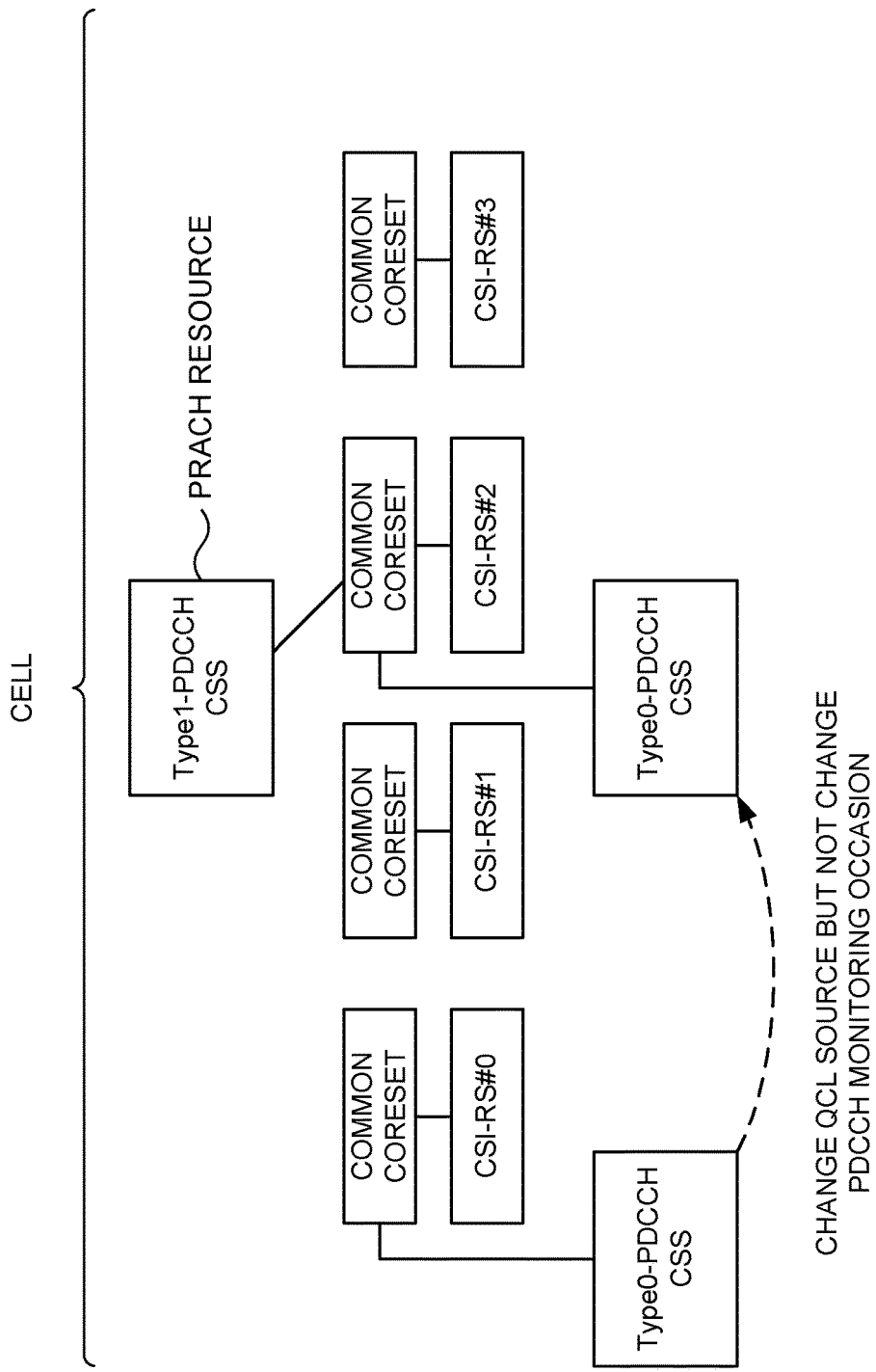
FIG. 3 is a diagram to show an example of an operation of changing the QCL source in the CSI-RS-based RA in case 3.

For example, as illustrated in FIG. 3, with CSI-RS #0 to #3 transmitted and with CSI-RS #0 set by the UE as a QCL source for the common CORESET, in a case where the CSI-RS-based RA of the UE is triggered and the UE selects CSI-RS #2 for the PRACH resource based on measurement of CSI-RS #0 to CSI-RS #3, the QCL source for the common CORESET is changed to CSI-RS #2. The UE does not change the PDCCH monitoring occasion for the type 0-PDCCH CSS (CORESET #0 and search space #0).

The UE uses, for PRACH transmission, the PRACH resource corresponding to CSI-RS #2. The type 1-PDCCH CSS for RAR reception (random access search space) is associated with the common CORESET, and thus, on the assumption that the type 1-PDCCH CSS is QCLed with CSI-RS #2 used as a QCL source for the common CORESET, the UE monitors the type 1-PDCCH CSS within the common CORESET.

According to Aspect 3, the random access search space is associated with the common CORESET, clarifying the QCL source for CORESET #0 and the PDCCH monitoring occasion for search space #0, and thus the UE can appropriately monitor the PDCCH.

(Other Aspects)

In the random access search space, the UE monitors the PDCCH for scheduling of the RAR. The CSI-RS-based RA is allowed only in a case where the UE-specific DL BWP is active and where the random access search space is associated with the common CORESET.

The PDCCH for the RAR can be received only in the random access search space, and in the CSI-RS-based RA, the random access search space is not associated with CORESET #0. Accordingly, in the CSI-RS-based RA, the PDCCH for the RAR within the random access search space is the selected CSI-RS and QCL.

Thus, the UE does not assume (expect) that the UE is configured with the CSI-RS-based RA and receives the PDCCH for scheduling of the RAR in the CORESET #0 associated with the SSB.

According to this aspect, a receiving operation for the RAR in the CSI-RS-based RA is clarified, allowing the UE to appropriately monitor the PDCCH.

(Radio Communication System)

Hereinafter, a structure of a radio communication system according to the present embodiment will be described. In this radio communication system, the radio communication method according to each embodiment of the present disclosure described above may be used alone or may be used in combination for communication.

Figure 4:
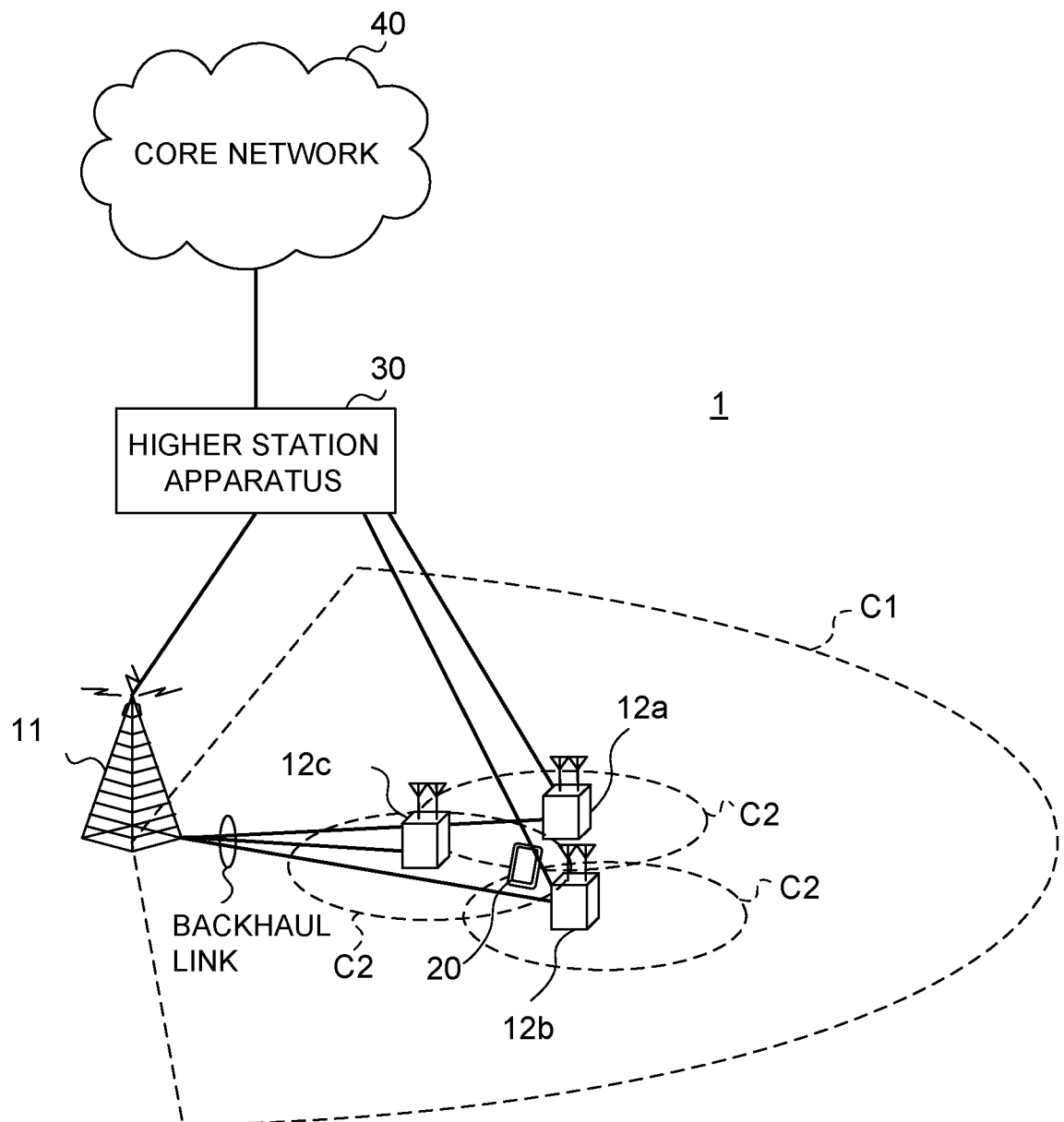
FIG. 4 is a diagram to show an example of a schematic structure of a radio communication system according to the present embodiment.

FIG. 4 is a diagram to show an example of a schematic structure of the radio communication system according to the present embodiment. A radio communication system 1 can adopt carrier aggregation (CA) and/or dual connectivity (DC) to group a plurality of fundamental frequency blocks (component carriers) into one, where the system bandwidth in an LTE system (for example, 20 MHz) constitutes one unit.

Note that the radio communication system 1 may be referred to as "Long Term Evolution (LTE)," "LTE-Advanced (LTE-A)," "LTE-Beyond (LTE-B)," "SUPER 3G," "IMT-Advanced," "4th generation mobile communication system (4G)," "5th generation mobile communication system (5G)," "New Radio (NR)," "Future Radio Access (FRA)," "New-RAT (Radio Access Technology)," and so on, or may be referred to as a system implementing these.

The radio communication system 1 includes a base station 11 that forms a macro cell C1 of a relatively wide coverage, and base stations 12 (12a to 12c) that form small cells C2, which are placed within the macro cell C1 and which are narrower than the macro cell C1. Also, user terminals 20 are placed in the macro cell C1 and in each small cell C2. The arrangement, the number, and the like of each cell and user terminal 20 are by no means limited to the aspect shown in the diagram.

The user terminals 20 can connect with both the base station 11 and the base stations 12. It is assumed that the user terminals 20 use the macro cell C1 and the small cells C2 at the same time by means of CA or DC. The user terminals 20 may apply CA or DC by using a plurality of cells (CCs).

Between the user terminals 20 and the base station 11, communication can be carried out by using a carrier of a relatively low frequency band (for example, 2 GHz) and a narrow bandwidth (referred to as, for example, an "existing carrier," a "legacy carrier" and so on). Meanwhile, between the user terminals 20 and the base stations 12, a carrier of a relatively high frequency band (for example, 3.5 GHz, 5 GHz, and so on) and a wide bandwidth may be used, or the same carrier as that used between the user terminals 20 and the base station 11 may be used. Note that the structure of the frequency band for use in each base station is by no means limited to these.

The user terminals 20 can perform communication by using time division duplex (TDD) and/or frequency division duplex (FDD) in each cell. Furthermore, in each cell (carrier), a single numerology may be employed, or a plurality of different numerologies may be employed.

Numerologies may be communication parameters applied to transmission and/or reception of a given signal and/or channel, and for example, may indicate at least one of a subcarrier spacing, a bandwidth, a symbol length, a cyclic prefix length, a subframe length, a TTI length, the number of symbols per TTI, a radio frame structure, a particular filter processing performed by a transceiver in a frequency domain, a particular windowing processing performed by a transceiver in a time domain, and so on. For example, if given physical channels use different subcarrier spacings of the OFDM symbols constituted and/or different numbers of the OFDM symbols, it may be referred to as that the numerologies are different.

A wired connection (for example, means in compliance with the Common Public Radio Interface (CPRI) such as an optical fiber, an X2 interface and so on) or a wireless connection may be established between the base station 11 and the base stations 12 (or between two base stations 12).

The base station 11 and the base stations 12 are each connected with a higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Each base station 12 may be connected with the higher station apparatus 30 via the base station 11.

Note that the base station 11 is a base station having a relatively wide coverage, and may be referred to as a "macro base station," a "central node," an "eNodeB (eNB)," a "transmitting/receiving point" and so on. The base stations 12 are base stations having local coverages, and may be referred to as "small base stations," "micro base stations," "pico base stations," "femto base stations," "Home eNodeBs (HeNBs)," "Remote Radio Heads (RRHs)," "transmitting/receiving points" and so on. Hereinafter, the base stations 11 and 12 will be collectively referred to as "base stations 10," unless specified otherwise.

Each of the user terminals 20 is a terminal that supports various communication schemes such as LTE and LTE-A, and may include not only mobile communication terminals (mobile stations) but stationary communication terminals (fixed stations).

In the radio communication system 1, as radio access schemes, orthogonal frequency division multiple access (OFDMA) is applied to the downlink, and single carrier frequency division multiple access (SC-FDMA) and/or OFDMA is applied to the uplink.

OFDMA is a multi-carrier communication scheme to perform communication by dividing a frequency band into a plurality of narrow frequency bands (subcarriers) and mapping data to each subcarrier. SC-FDMA is a single carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are by no means limited to the combinations of these, and other radio access schemes may be used.

In the radio communication system 1, a downlink shared channel (Physical Downlink Shared Channel (PDSCH), which is used by each user terminal 20 on a shared basis, a broadcast channel (Physical Broadcast Channel (PBCH)), downlink L1/L2 control channels and so on, are used as downlink channels. User data, higher layer control information, System Information Blocks (SIBs) and so on are communicated on the PDSCH. The Master Information Blocks (MIBs) are communicated on the PBCH.

The downlink L1/L2 control channels include a Physical Downlink Control Channel (PDCCH), an Enhanced Physical Downlink Control Channel (EPDCCH), a Physical Control Format Indicator Channel (PCFICH), a Physical Hybrid-ARQ Indicator Channel (PHICH) and so on. Downlink control information (DCI), including PDSCH and/or PUSCH scheduling information, and so on are communicated on the PDCCH.

For example, the DCI used for scheduling of DL data reception may be referred to as "DL assignment," and the DCI used for scheduling of UL data transmission may be referred to as "UL grant."

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on are used as uplink channels. User data, higher layer control information and so on are communicated on the PUSCH. In addition, radio quality information (Channel Quality Indicator (CQI)) of the downlink, transmission confirmation information, scheduling request (SR), and so on are transmitted on the PUCCH. By means of the PRACH, random access preambles for establishing connections with cells are communicated.

In the radio communication system 1, a cell-specific reference signal (CRS), a channel state information-reference signal (CSI-RS), a demodulation reference signal (DMRS), a positioning reference signal (PRS), and so on are transmitted as downlink reference signals. In the radio communication system 1, a measurement reference signal (Sounding Reference Signal (SRS)), a demodulation reference signal (DMRS), and so on are transmitted as uplink reference signals. Note that DMRS may be referred to as a "user terminal specific reference signal (UE-specific Reference Signal)." Transmitted reference signals are by no means limited to these.

(Base Station)

Figure 5:
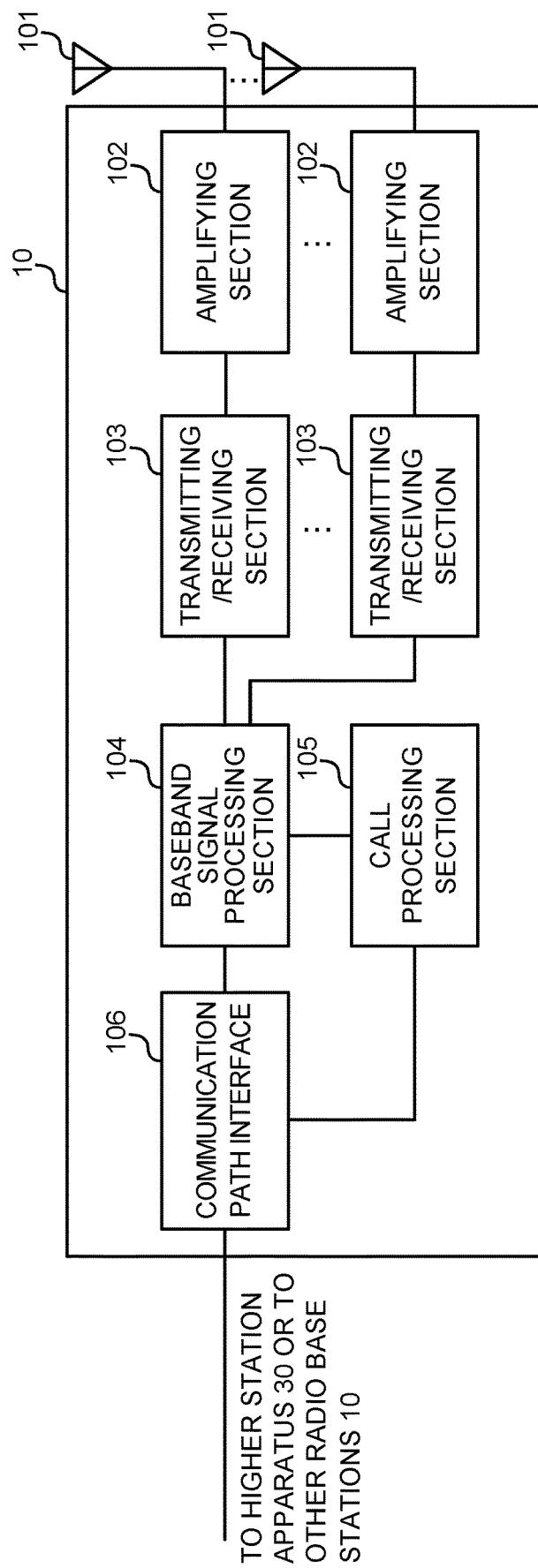
FIG. 5 is a diagram to show an example of an overall structure of a base station according to the present embodiment.

FIG. 5 is a diagram to show an example of an overall structure of the base station according to the present embodiment. A base station 10 includes a plurality of transmitting/receiving antennas 101, amplifying sections 102, transmitting/receiving sections 103, a baseband signal processing section 104, a call processing section 105 and a communication path interface 106. Note that the base station 10 may be configured to include one or more transmitting/receiving antennas 101, one or more amplifying sections 102 and one or more transmitting/receiving sections 103.

User data to be transmitted from the base station 10 to the user terminal 20 by the downlink is input from the higher station apparatus 30 to the baseband signal processing section 104, via the communication path interface 106.

In the baseband signal processing section 104, the user data is subjected to transmission processes, such as a Packet Data Convergence Protocol (PDCP) layer process, division and coupling of the user data, Radio Link Control (RLC) layer transmission processes such as RLC retransmission control, Medium Access Control (MAC) retransmission control (for example, an HARQ transmission process), scheduling, transport format selection, channel coding, an inverse fast Fourier transform (IFFT) process, and a pre-coding process, and the result is forwarded to each transmitting/receiving section 103. Furthermore, downlink control signals are also subjected to transmission processes such as channel coding and inverse fast Fourier transform, and the result is forwarded to each transmitting/receiving section 103.

The transmitting/receiving sections 103 convert baseband signals that are pre-coded and output from the baseband signal processing section 104 on a per antenna basis, to have radio frequency bands and transmit the result. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted with transmitters/receivers, transmitting/receiving circuits or transmitting/receiving apparatus that can be described based on general understanding of the technical field to which the present disclosure pertains. Note that each transmitting/receiving section 103 may be structured as a transmitting/receiving section in one entity, or may be constituted with a transmitting section and a receiving section.

Meanwhile, as for uplink signals, radio frequency signals that are received in the transmitting/receiving antennas 101 are amplified in the amplifying sections 102. The transmitting/receiving sections 103 receive the uplink signals amplified in the amplifying sections 102. The transmitting/receiving sections 103 convert the received signals into the baseband signal through frequency conversion and outputs to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (setting up, releasing and so on) for communication channels, manages the state of the base station 10, manages the radio resources and so on.

The communication path interface 106 transmits and/or receives signals to and/or from the higher station apparatus 30 via a given interface. The communication path interface 106 may transmit and/or receive signals (backhaul signaling) with other base stations 10 via an inter-base station interface (for example, an optical fiber in compliance with the Common Public Radio Interface (CPRI) and an X2 interface).

Note that each transmitting/receiving section 103 may further include an analog beamforming section performing analog beamforming. The analog beamforming section may be constituted with an analog beamforming circuit (for example, a phase shifter, a phase shift circuit), or an analog beamforming apparatus (for example, a phase shift device) described based on general understanding of the technical field to which the present invention pertains. The transmitting/receiving antenna 101 may be constituted by, for example, an array antenna.

Figure 6:
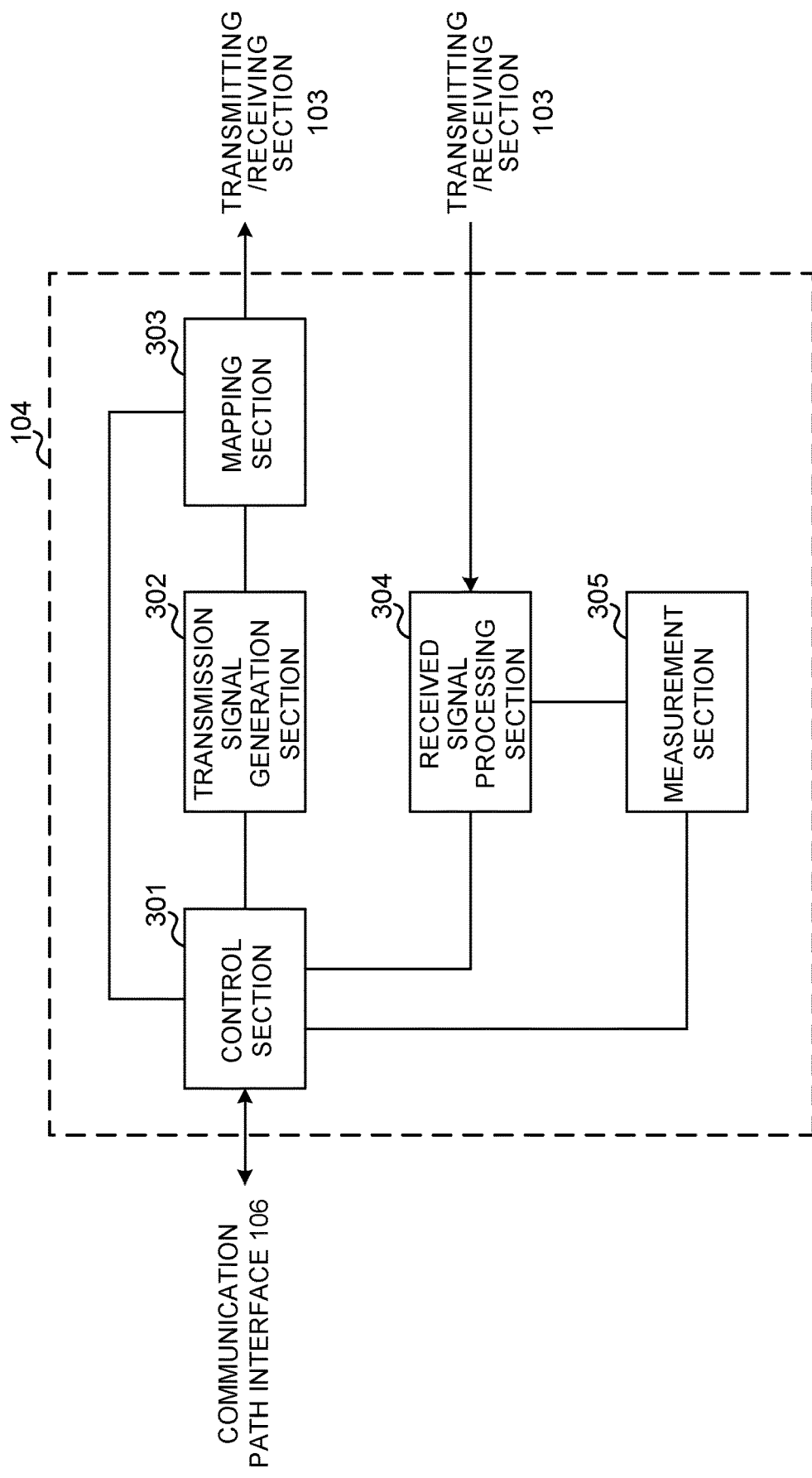
FIG. 6 is a diagram to show an example of a functional structure of the base station according to the present embodiment.

FIG. 6 is a diagram to show an example of a functional structure of the base station according to the present embodiment. Note that, the present example primarily shows functional blocks that pertain to characteristic parts of the present embodiment, and it is assumed that the base station 10 may include other functional blocks that are necessary for radio communication as well.

The baseband signal processing section 104 at least includes a control section (scheduler) 301, a transmission signal generation section 302, a mapping section 303, a received signal processing section 304, and a measurement section 305. Note that these structures may be included in the base station 10, and some or all of the structures do not need to be included in the baseband signal processing section 104.

The control section (scheduler) 301 controls the whole of the base station 10. The control section 301 can be constituted with a controller, a control circuit or control apparatus that can be described based on general understanding of the technical field to which the present disclosure pertains.

The control section 301, for example, controls the generation of signals in the transmission signal generation section 302, the mapping of signals by the mapping section 303, and so on. The control section 301 controls the signal receiving processes in the received signal processing section 304, the measurements of signals in the measurement section 305, and so on.

The control section 301 controls the scheduling (for example, resource assignment) of system information, a downlink data signal (for example, a signal transmitted on the PDSCH), a downlink control signal (for example, a signal transmitted on the PDCCH. Transmission confirmation information, and so on). Based on the results of determining necessity or not of retransmission control to the uplink data signal, or the like, the control section 301 controls generation of a downlink control signal, a downlink data signal, and so on.

The control section 301 controls the scheduling of a synchronization signal (for example, Primary Synchronization Signal (PSS)/Secondary Synchronization Signal (SSS)), an SSB, a downlink reference signal (for example, CRS, CSI-RS, DMRS), and so on.

The control section 301 controls the scheduling of an uplink data signal (for example, a signal transmitted on the PUSCH), an uplink control signal (for example, a signal transmitted on the PUCCH and/or the PUSCH. Transmission confirmation information, and so on), a random access preamble (for example, a signal transmitted on the PRACH), an uplink reference signal, and so on.

The control section 301 may perform control to form a transmit beam and/or receive beam by using digital BF (for example, precoding) in the baseband signal processing section 104 and/or analog BF (for example, phase rotation) in the transmitting/receiving section 103. The control section 301 may perform control to form a beam based on downlink channel information, uplink channel information, and so on. These pieces of channel information may be obtained from the received signal processing section 304 and/or the measurement section 305.

The transmission signal generation section 302 generates downlink signals (downlink control signals, downlink data signals, downlink reference signals and so on) based on commands from the control section 301 and outputs the downlink signals to the mapping section 303. The transmission signal generation section 302 can be constituted with a signal generator, a signal generation circuit or signal generation apparatus that can be described based on general understanding of the technical field to which the present disclosure pertains.

For example, the transmission signal generation section 302 generates DL assignment to report assignment information of downlink data and/or UL grant to report assignment information of uplink data, based on commands from the control section 301. The DL assignment and the UL grant are both DCI, and follow the DCI format. For a downlink data signal, encoding processing and modulation processing are performed in accordance with a coding rate, modulation scheme, or the like determined based on channel state information (CSI) from each user terminal 20.

The mapping section 303 maps the downlink signals generated in the transmission signal generation section 302 to given radio resources, based on commands from the control section 301, and outputs these to the transmitting/receiving sections 103. The mapping section 303 can be constituted with a mapper, a mapping circuit or mapping apparatus that can be described based on general understanding of the technical field to which the present disclosure pertains.

The received signal processing section 304 performs receiving processes (for example, demapping, demodulation, decoding and so on) of received signals that are input from the transmitting/receiving sections 103. Here, the received signals are, for example, uplink signals that are transmitted from the user terminals 20 (uplink control signals, uplink data signals, uplink reference signals and so on). The received signal processing section 304 can be constituted with a signal processor, a signal processing circuit or signal processing apparatus that can be described based on general understanding of the technical field to which the present disclosure pertains.

The received signal processing section 304 outputs the decoded information acquired through the receiving processes to the control section 301. For example, if the received signal processing section 304 receives the PUCCH including HARQ-ACK, the received signal processing section 304 outputs the HARQ-ACK to the control section 301. The received signal processing section 304 outputs the received signals and/or the signals after the receiving processes to the measurement section 305.

The measurement section 305 conducts measurements with respect to the received signals. The measurement section 305 can be constituted with a measurer, a measurement circuit or measurement apparatus that can be described based on general understanding of the technical field to which the present disclosure pertains.

For example, the measurement section 305 may perform Radio Resource Management (RM) measurement, Channel State Information (CSI) measurement, and so on, based on the received signal. The measurement section 305 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 301.

Note that the transmitting/receiving section 103 may determine a beam corresponding to resource for a random access preamble received from the user terminal 30 and use the determined beam to transmit the PDCCH for scheduling of the random access response (RAR) and the RAR.

(User Terminal)

Figure 7:
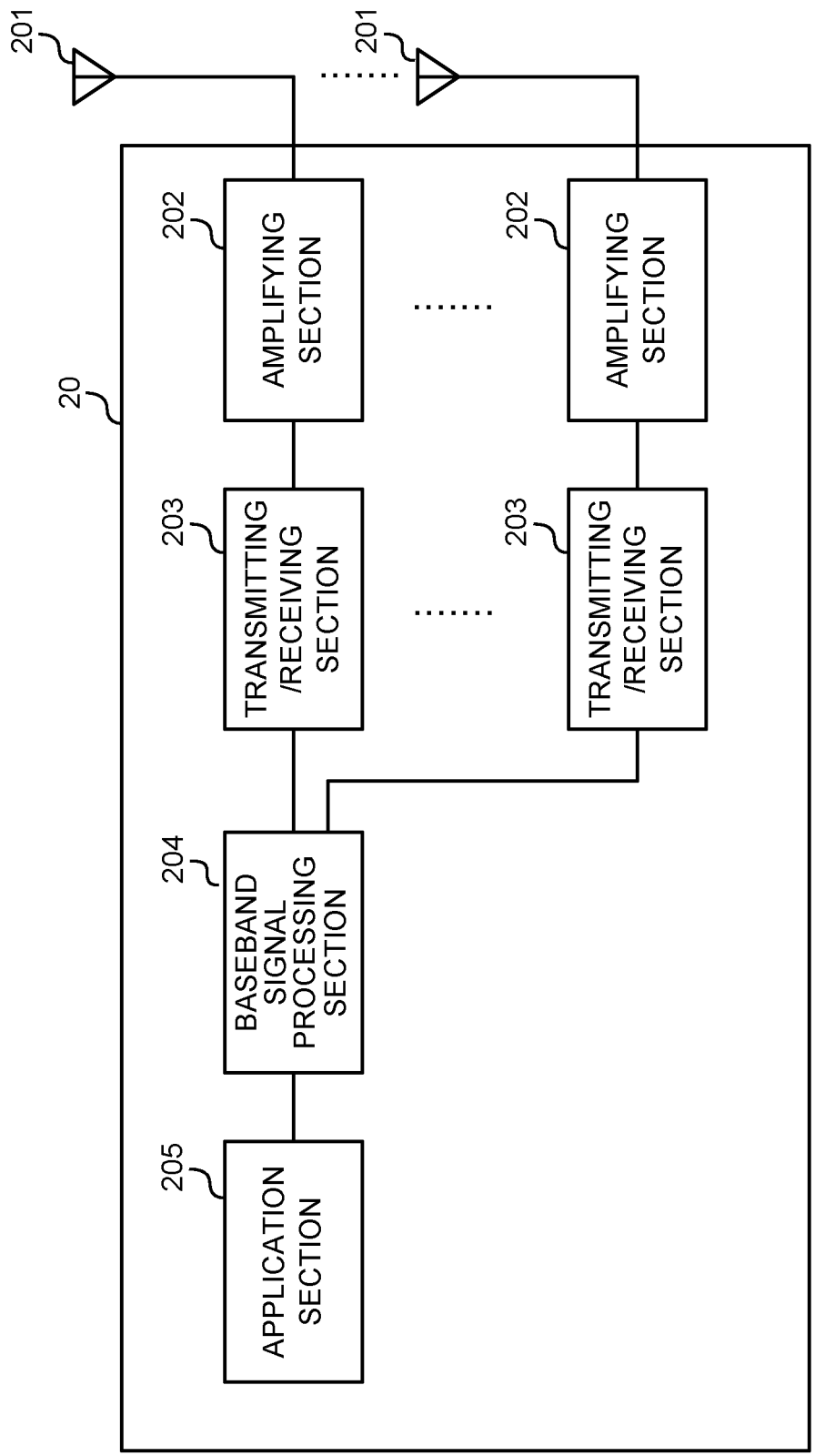
FIG. 7 is a diagram to show an example of an overall structure of a user terminal according to the present embodiment.

FIG. 7 is a diagram to show an example of an overall structure of a user terminal according to the present embodiment. A user terminal 20 includes a plurality of transmitting/ receiving antennas 201, amplifying sections 202, transmitting/receiving sections 203, a baseband signal processing section 204 and an application section 205. Note that the user terminal 20 may be configured to include one or more transmitting/receiving antennas 201, one or more amplifying sections 202 and one or more transmitting/receiving sections 203.

Radio frequency signals that are received in the transmitting/receiving antennas 201 are amplified in the amplifying sections 202. The transmitting/receiving sections 203 receive the downlink signals amplified in the amplifying sections 202. The transmitting/receiving sections 203 convert the received signals into baseband signals through frequency conversion, and output the baseband signals to the baseband signal processing section 204. The transmitting/receiving sections 203 can be constituted with transmitters/receivers, transmitting/receiving circuits or transmitting/receiving apparatus that can be described based on general understanding of the technical field to which the present disclosure pertains. Note that each transmitting/receiving section 203 may be structured as a transmitting/receiving section in one entity, or may be constituted with a transmitting section and a receiving section.

The baseband signal processing section 204 performs, on each input baseband signal, an FFT process, error correction decoding, a retransmission control receiving process, and so on. The downlink user data is forwarded to the application section 205. The application section 205 performs processes related to higher layers above the physical layer and the MAC layer, and so on. In the downlink data, broadcast information may be also forwarded to the application section 205.

Meanwhile, the uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving section 203.

The transmitting/receiving sections 203 convert the baseband signals output from the baseband signal processing section 204 to have radio frequency band and transmit the result. The radio frequency signals having been subjected to frequency conversion in the transmitting/receiving sections 203 are amplified in the amplifying sections 202, and transmitted from the transmitting/receiving antennas 201.

Note that the transmitting/receiving section 203 may further include an analog beam forming section that implements analog beam forming. The analog beamforming section may be constituted with an analog beamforming circuit (for example, a phase shifter, a phase shift circuit), or an analog beamforming apparatus (for example, a phase shift device) described based on general understanding of the technical field to which the present invention pertains. The transmitting/receiving antenna 201 may be constituted by, for example, an array antenna.

Figure 8:
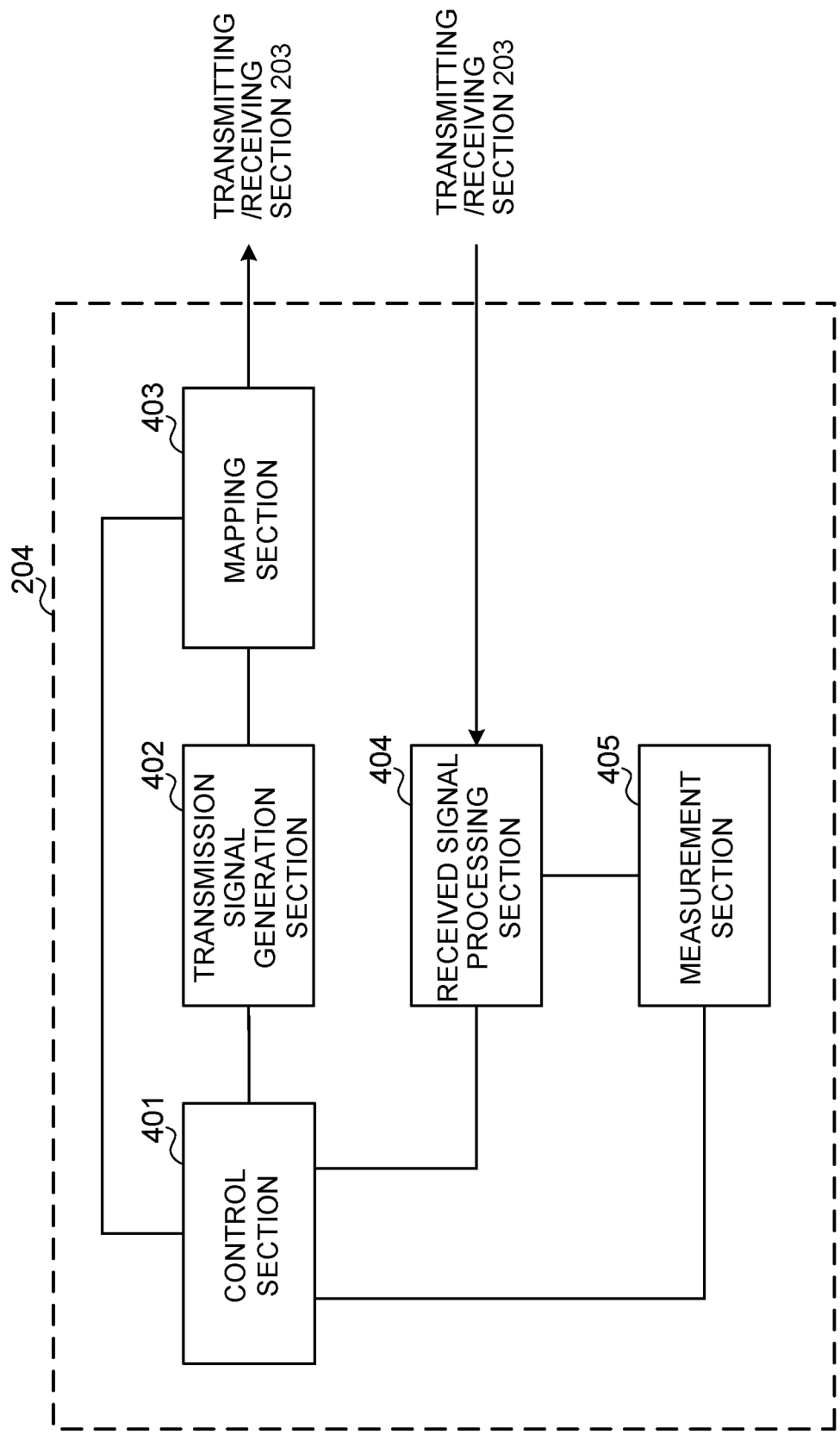
FIG. 8 is a diagram to show an example of a functional structure of the user terminal according to the present embodiment.

FIG. 8 is a diagram to show an example of a functional structure of a user terminal according to the present embodiment. Note that, the present example primarily shows functional blocks that pertain to characteristic parts of the present embodiment, and it is assumed that the user terminal 20 may include other functional blocks that are necessary for radio communication as well.

The baseband signal processing section 204 provided in the user terminal 20 at least includes a control section 401, a transmission signal generation section 402, a mapping section 403, a received signal processing section 404 and a measurement section 405. Note that these structures may be included in the user terminal 20, and some or all of the structures do not need to be included in the baseband signal processing section 204.

The control section 401 controls the whole of the user terminal 20. The control section 401 can be constituted with a controller, a control circuit or control apparatus that can be described based on general understanding of the technical field to which the present disclosure pertains.

The control section 401, for example, controls the generation of signals in the transmission signal generation section 402, the mapping of signals by the mapping section 403, and so on. The control section 401 controls the signal receiving processes in the received signal processing section 404, the measurements of signals in the measurement section 405, and so on.

The control section 401 acquires a downlink control signal and a downlink data signal transmitted from the base station 10, from the received signal processing section 404. The control section 401 controls generation of an uplink control signal and/or an uplink data signal, based on the results of determining necessity or not of retransmission control to a downlink control signal and/or a downlink data signal.

The control section 401 may perform control to form a transmit beam and/or receive beam by using digital BF (for example, precoding) in the baseband signal processing section 204 and/or analog BF (for example, phase rotation) in the transmitting/receiving section 203. The control section 401 may perform control to form a beam based on downlink channel information, uplink channel information, and so on. These pieces of channel information may be obtained from the received signal processing section 404 and/or the measurement section 405.

Additionally, in a case where the control section 401 acquires a variety of information reported by the base station 10 from the received signal processing section 404, the control section 401 may update parameters to use for control, based on the information.

The transmission signal generation section 402 generates uplink signals (uplink control signals, uplink data signals, uplink reference signals and so on) based on commands from the control section 401, and outputs the uplink signals to the mapping section 403. The transmission signal generation section 402 can be constituted with a signal generator, a signal generation circuit or signal generation apparatus that can be described based on general understanding of the technical field to which the present disclosure pertains.

For example, the transmission signal generation section 402 generates an uplink control signal about transmission confirmation information, the channel state information (CSI), and so on, based on commands from the control section 401. The transmission signal generation section 402 generates uplink data signals, based on commands from the control section 401. For example, when a UL grant is included in a downlink control signal that is reported from the base station 10, the control section 401 commands the transmission signal generation section 402 to generate the uplink data signal.

The mapping section 403 maps the uplink signals generated in the transmission signal generation section 402 to radio resources, based on commands from the control section 401, and outputs the result to the transmitting/receiving sections 203. The mapping section 403 can be constituted with a mapper, a mapping circuit or mapping apparatus that can be described based on general understanding of the technical field to which the present disclosure pertains.

The received signal processing section 404 performs receiving processes (for example, demapping, demodulation, decoding and so on) of received signals that are input from the transmitting/receiving sections 203. Here, the received signals are, for example, downlink signals transmitted from the base station 10 (downlink control signals, downlink data signals, downlink reference signals and so on). The received signal processing section 404 can be constituted with a signal processor, a signal processing circuit or signal processing apparatus that can be described based on general understanding of the technical field to which the present disclosure pertains. The received signal processing section 404 can constitute the receiving section according to the present disclosure.

The received signal processing section 404 outputs the decoded information acquired through the receiving processes to the control section 401. The received signal processing section 404 outputs, for example, broadcast information, system information, RRC signaling, DCI and so on, to the control section 401. The received signal processing section 404 outputs the received signals and/or the signals after the receiving processes to the measurement section 405.

The measurement section 405 conducts measurements with respect to the received signals. For example, the measurement section 405 may perform the same frequency measurement and/or different frequency measurements on one or both of a first carrier and a second carrier. In a case where the first carrier includes a serving cell, the measurement section 405 may perform different frequency measurements on the second carrier based on a measurement instruction obtained from the received signal processing section 404. The measurement section 405 can be constituted with a measurer, a measurement circuit or measurement apparatus that can be described based on general understanding of the technical field to which the present disclosure pertains.

For example, the measurement section 405 may perform RRM measurement, CSI measurement, and so on, based on the received signal. The measurement section 405 may measure a received power (for example, RSRP), a received quality (for example, RSRQ, SINR, SNR), a signal strength (for example, RSSI), channel information (for example, CSI), and so on. The measurement results may be output to the control section 401.

The transmitting/receiving sections 203 may receive signals (RS, SSBmCSI-RS, and so on) in the initial access or random access. The control section 401 may determine a specific signal (QCL source, QCL reference, or the like) quasi-co-located (QCL) with a downlink control channel (PDCCH) in a specific control resource set (CORESET #0 or common CORESET) associated with a random access search space, based on reception of the signal.

The above-described specific control resource set may be a control resource set (CORESET #0) used for scheduling of the system information.

The above-described specific control resource set may be a control resource set (common CORESET) not used for scheduling of the system information.

A search space (search space #0) determined by at least one of reception of a synchronization signal block in the above-described initial access and information included in the above-described system information and indicating a search space used for scheduling of the above-described system information may be associated with the control resource set (CORESET #0) used for scheduling of the above-described system information.

The above-described control section may determine a monitoring occasion for the above-described downlink control channel (PDCCH monitoring occasion), based on the above-described specific signal.

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 9:
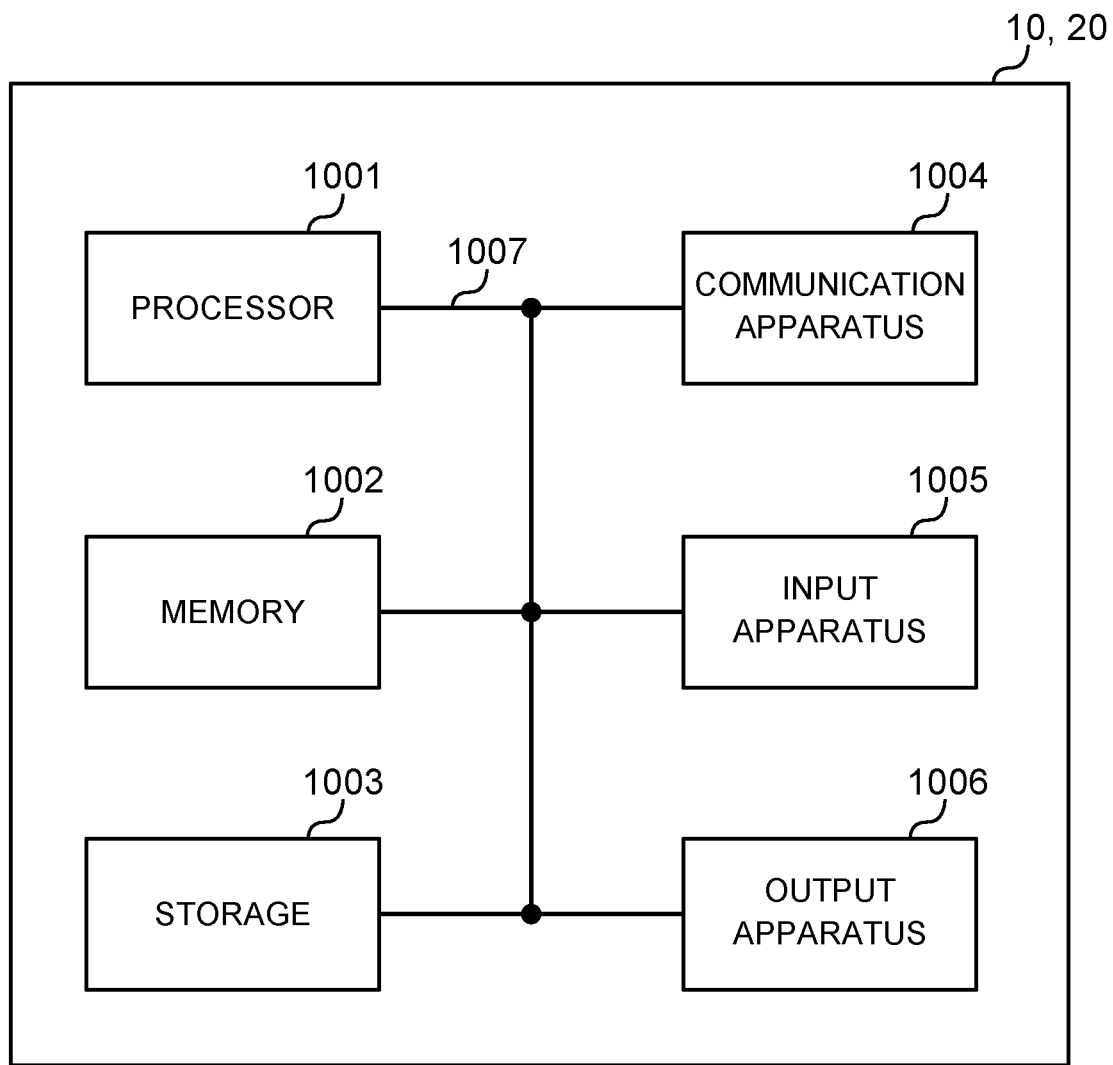
FIG. 9 is a diagram to show an example of a hardware structure of the base station and the user terminal according to the present embodiment.

For example, a base station, a user terminal, and so on according to one embodiment of the present disclosure may function as a computer that executes the processes of the radio communication method of the present disclosure. FIG. 9 is a diagram to show an example of a hardware structure of the base station and the user terminal according to one embodiment. Physically, the above-described base station 10 and user terminal 20 may each be formed as computer an apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing given software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, the above-described baseband signal processing section 104 (204), call processing section 105, and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 401 of each user terminal 20 may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving antennas 101 (201), amplifying sections 102 (202), transmitting/receiving sections 103 (203), communication path interface 106, and so on may be implemented by the communication apparatus 1004. In the transmitting/receiving section 103 (203), the transmitting section 103*a* (203*a*) and the receiving section 103*b* (203*b*) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, an LED (Light Emitting Diode) lamp, and so on).

Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application-Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a given signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "transmission time interval (TTI)," a plurality of consecutive subframes may be referred to as a "TTI" or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in LTE Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "sub-carrier group (SCG)," a "resource element group (REG), "a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for given numerology in a given carrier. Here, a common RB may be specified by an index of the RB based on the common reference point of the carrier. A PRB may be defined by a given BWP and may be numbered in the BWP.

The BWP may include a BWP for the UL (UL BWP) and a BWP for the DL (DL BWP). One or a plurality of BWPs may be configured in one carrier for a UE.

At least one of configured BWPs may be active, and a UE does not need to assume to transmit/receive a given signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to given values, or may be represented in another corresponding information. For example, radio resources may be specified by given indices.

The names used for parameters and so on in the present disclosure are in no respect limiting. Furthermore, mathematical expressions that use these parameters, and so on may be different from those expressly disclosed in the present disclosure. For example, since various channels (Physical Uplink Control Channel (PUCCH), Physical Downlink Control Channel (PDCCH), and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals and/or combinations of these.

Note that physical layer signaling may be referred to as "L1/L2 (Layer 1/Layer 2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of given information (for example, reporting of "X holds") does not necessarily have to be reported explicitly, and can be reported implicitly (by, for example, not reporting this given information or reporting another piece of information).

Determinations may be made in values represented by one bit (0 or 1), may be made in Boolean values that represent true or false, or may be made by comparing numerical values (for example, comparison against a given value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure are used interchangeably.

In the present disclosure, the terms such as "precoding," a "precoder," a "weight (precoding wait)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," "a" a "radio base station," a "fixed station," a "NodeB," "an "eNodeB (eNB)," a "gNodeB (gNB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a "small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a mobile body or a mobile body itself, and so on. The mobile body may be a vehicle (for example, a car, an airplane, and the like), may be a mobile body which moves unmanned (for example, a drone, an automatic operation car, and the like), or may be a robot (a manned type or unmanned type). Note that at least one of a base station and a mobile station also includes an apparatus which does not necessarily move in communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GW), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), Future Radio Access (FRA), New-RAT (Radio Access Technology), New Radio (NR), New radio access (NX), Future generation radio access (FX), GSM (registered trademark) (Global System for Mobile communications), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

"The maximum transmit power" according to the present disclosure may mean a maximum value of the transmit power, may mean the nominal maximum transmit power (the nominal UE maximum transmit power), or may mean the rated maximum transmit power (the rated UE maximum transmit power).

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

What is claimed is:

1. A terminal comprising:
a receiver that receives a system information block (SIB) 1; and
a processor that determines, for a search space having an index equal to 0 configured based on the SIB 1, a physical downlink control channel (PDCCH) monitoring occasion,
wherein the determined PDCCH monitoring occasion that is for the search space having the index equal to 0, the search space being configured based on the SIB 1, is associated with a synchronization signal (SS)/physical broadcast channel (PBCH) block selected in a contention-based Random Access (CBRA) procedure,
the processor monitors the determined PDCCH monitoring occasion, and
the processor assumes that a demodulation reference signal antenna port for PDCCH reception in a control resource set having an index equal to 0 is quasi-co-located with the SS/PBCH block.

2. A base station comprising:
a transmitter that transmits a system information block (SIB) 1; and
a processor that determines, for a search space having an index equal to 0 configured based on the SIB 1, a physical downlink control channel (PDCCH) monitoring occasion; and
wherein the processor determines that the PDCCH monitoring occasion that is for the search space having the index equal to 0, the search space being configured based on the SIB 1, is associated with a synchronization signal (SS)/physical broadcast channel (PBCH) block selected by a terminal in a contention-based Random Access (CBRA) procedure, and a demodulation reference signal antenna port for PDCCH reception in a control resource set having a index equal to 0 is quasi-co-located with the SS/PBCH block.

3. A radio communication method for a terminal comprising:
receiving a system information block (SIB) 1;
determining, for a search space having an index equal to 0 configured based on the SIB 1, a physical downlink control channel (PDCCH) monitoring occasion,
wherein the determined PDCCH monitoring occasion that is for the search space having the index equal to 0, the search space being configured based on the SIB 1, is associated with a synchronization signal (SS)/physical broadcast channel (PBCH) block selected in a contention-based Random Access (CBRA) procedure;
monitoring the determined PDCCH monitoring occasion; and
assuming that a demodulation reference signal antenna port for PDCCH reception in a control resource set having a index equal to 0 is quasi-co-located with the SS/PBCH block.

4. A system comprising a base station and a terminal, wherein:
the base station comprises:
a transmitter that transmits a system information block (SIB) 1; and
a first processor that determines, for a search space having an index equal to 0 configured based on the SIB 1, a physical downlink control channel (PDCCH) monitoring occasion; and
wherein the first processor determines that the PDCCH monitoring occasion that is for the search space having the index equal to 0, the search space being configured based on the SIB 1, is associated with a synchronization signal (SS)/physical broadcast channel (PBCH) block selected by the terminal in a contention-based Random Access (CBRA) procedure; and
the terminal comprises:
a receiver that receives the SIB 1; and
a second processor that determines the PDCCH monitoring occasion,
wherein the second processor monitors the determined PDCCH monitoring occasion, and
the second processor assumes that a demodulation reference signal antenna port for PDCCH reception in a control resource set having an index equal to 0 is quasi-co-located with the SS/PBCH block.

* * * * *